(12) United States Patent
Takahashi et al.

(10) Patent No.: US 8,985,524 B2
(45) Date of Patent: Mar. 24, 2015

(54) ON-BOARD DEVICE FOR TRAIN CONTROL SYSTEM

(71) Applicant: The Nippon Signal Co., Ltd., Tokyo (JP)

(72) Inventors: Masahide Takahashi, Kuki (JP); Naoto Hashimoto, Kuki (JP)

(73) Assignee: The Nippon Signal Co., Ltd., Tokyo (JP)

( * ) Notice: Subject to any disclaimer, the term of this patent is extended or adjusted under 35 U.S.C. 154(b) by 0 days.

(21) Appl. No.: 14/227,573

(22) Filed: Mar. 27, 2014

(65) Prior Publication Data

US 2014/0209755 A1 Jul. 31, 2014

Related U.S. Application Data

(63) Continuation of application No. PCT/JP2012/074377, filed on Sep. 24, 2012.

(30) Foreign Application Priority Data

Sep. 30, 2011 (JP) .................................. 2011-216843

(51) Int. Cl.
*B61L 3/22* (2006.01)
*B61L 3/00* (2006.01)
(Continued)

(52) U.S. Cl.
CPC . *B61L 3/00* (2013.01); *B60L 15/40* (2013.01); *B61L 15/0027* (2013.01); *B61L 27/0038* (2013.01); *B61L 27/0061* (2013.01); *B61L 15/0063* (2013.01); *B61L 3/121* (2013.01); *B61L 3/225* (2013.01); *B61L 2027/005* (2013.01); *B60L 2240/12* (2013.01); *B60L 2240/62* (2013.01); *Y02T 90/16* (2013.01); *Y02T 90/162* (2013.01); *B60L 2240/70* (2013.01); *B60L 2200/26* (2013.01)
USPC ...................... 246/167 R; 246/122 R; 701/19

(58) Field of Classification Search
USPC .................... 246/2 R, 4, 6, 2 S, 167 R, 122 R
See application file for complete search history.

(56) References Cited

U.S. PATENT DOCUMENTS

| 4,532,511 A * | 7/1985 | Lemelson ..................... 340/933 |
| 7,201,350 B2 * | 4/2007 | Sugita et al. .............. 246/122 R |

(Continued)

FOREIGN PATENT DOCUMENTS

| JP | 08-207769 A | 8/1996 |
| JP | 2005-206100 A | 8/2005 |

(Continued)

*Primary Examiner* — Jason C Smith
(74) *Attorney, Agent, or Firm* — Foley & Lardner LLP

(57) ABSTRACT

An on-board device capable of receiving train control signals from ground-side equipment of train control systems of different types or the like to control the speed of a train and the like appropriately, is provided. An on-board device 10 mounted on a train 1 includes ATC/TD antennas 11a, 11b that receive an ATC signal including train control information from loop coils installed along a route of the train 1, a vehicle radio set 12 that receives a CBTC signal including train control information from wayside radio sets installed along the route, an ATC control unit 141 that controls the train 1 based on the train control information in the ATC signal, a CBTC control unit 142 that controls the train 1 based on the train control information in the CBTC signal, and a selection unit 143 that selects the ATC control unit 141 or the CBTC control unit 142.

12 Claims, 2 Drawing Sheets

(51) Int. Cl.
  *B60L 15/40* (2006.01)
  *B61L 15/00* (2006.01)
  *B61L 27/00* (2006.01)
  *B61L 3/12* (2006.01)

(56) References Cited

U.S. PATENT DOCUMENTS

| | | | |
|---|---|---|---|
| 7,742,849 B2* | 6/2010 | Muinonen et al. | 701/19 |
| 7,983,806 B2* | 7/2011 | Muinonen et al. | 701/19 |
| 8,239,080 B2* | 8/2012 | Chun | 701/19 |
| 2005/0133673 A1* | 6/2005 | Sugita et al. | 246/167 R |
| 2008/0068164 A1* | 3/2008 | Campbell | 340/572.1 |
| 2011/0186692 A1* | 8/2011 | Kumar et al. | 246/29 R |
| 2013/0193276 A1* | 8/2013 | Hunter | 246/122 R |
| 2013/0248658 A1* | 9/2013 | Takagi | 246/122 R |
| 2014/0012438 A1* | 1/2014 | Shoppa et al. | 701/19 |
| 2014/0042279 A1* | 2/2014 | Kadono et al. | 246/167 R |
| 2014/0054424 A1* | 2/2014 | Xu et al. | 246/122 R |
| 2014/0103166 A1* | 4/2014 | Asuka et al. | 246/4 |
| 2014/0131524 A1* | 5/2014 | Grimm et al. | 246/3 |
| 2014/0138495 A1* | 5/2014 | Lostun et al. | 246/219 |
| 2014/0172205 A1* | 6/2014 | Ruhland et al. | 701/19 |

FOREIGN PATENT DOCUMENTS

| | | |
|---|---|---|
| JP | 2005-323445 A | 11/2005 |
| JP | 2008-162548 A | 7/2008 |
| JP | 2010-036803 A | 2/2010 |
| JP | 2011-087343 A | 4/2011 |

* cited by examiner

ON-BOARD DEVICE FOR TRAIN CONTROL SYSTEM

This application is a continuation application of PCT/JP2012/074377, filed on Sep. 24, 2012.

BACKGROUND OF THE INVENTION

1. Field of the Invention

The present invention relates to a train control system, and particularly to an on-board device mounted on a train to control the speed of the train and the like based on train control information received from ground-side equipment.

2. Description of Related Art

In general, a train control system is configured such that an on-board device mounted on a train controls the speed of the train and the like based on train control information received from ground-side equipment to ensure the safe traveling of the train. As a conventional train control system, there is known a train control system in which loop coils (or track circuits), ground coils, and the like, as the ground-side equipment are electromagnetically coupled to a receiver, an on-board coils, and the like, that constitute the on-board device, to transmit and receive train control information, or a train control system in which the train control information is transmitted and received between wayside radio sets as the ground-side equipment and vehicle radio sets that constitute the on-board device (refer to Japanese Laid-Open Patent Publication No. 2010-36803, Japanese Laid-Open Patent Publication No. 2008-162548).

The conventional on-board devices can receive train control information only from ground-side equipment of a train control system using signals of the same type and/or the same kind. Therefore, trains traveling through a zone (train line) along which ground-side equipment of a specific train control system are installed are limited to those with an on-board device for the specific train control system mounted thereon.

With the development of railroad networks, the need to make trains travel through zones each using train control systems of different types or the need to employ train control systems of different types in some parts of a zone may arise. However, it is difficult for the conventional techniques to meet such a need.

Furthermore, when an existing system is changed to a new system, there is a need to achieve a balance between commercial operations by the existing system and the adjustment of the new system during the transition. Therefore, upon changing the system, an on-board device for the new system must be added to trains with an on-board device for the existing system mounted thereon, and after the completion of the adjustment of the new system, the on-board device for the existing system must be removed. In other words, the trains need to be altered at least twice, and this requires much time and effort at system change.

SUMMARY OF THE INVENTION

The present invention has been made in view of such situations, and it is an object thereof to provide an on-board device capable of receiving train control information from ground-side equipment of train control systems of different types or the like to control the speed of a train and the like appropriately.

An on-board device according to one aspect of the present invention is mounted on a train to control the train based on train control information received from ground-side equipment. This on-board device includes a first receiving unit capable of receiving a first signal including train control information from first ground-side equipment installed along a route of the train, a second receiving unit capable of receiving a second signal different in kind from the first signal and including train control information from second ground-side equipment installed along the route, a first control unit that controls the train based on the train control information included in the first signal, a second control unit that controls the train based on the train control information included in the second signal, and a selection unit that selects the first control unit or the second control unit.

According to the on-board device mentioned above, train control signals can be received from respective ground-side equipment using different kinds of signals, and this allows the train to travel in zones (train lines) employing different train control systems without any alteration of the train such as the addition or change of the on-board device. Furthermore, the number of alterations of the train upon changing the train control system can be reduced compared with the conventional one.

DESCRIPTION OF THE PREFERRED EMBODIMENTS

First, a summary of the present invention will be described.

The present invention provides a novel on-board device for train control systems. The on-board device according to the present invention is mounted on a train and configured to be able to receive train control information from ground-side equipment of at least two train control systems using different signals from each other in order to control the speed of the train and the like based on either piece of the train control information received.

Embodiments of the present invention will be described below with reference to the accompanying drawings.

Figure 1:
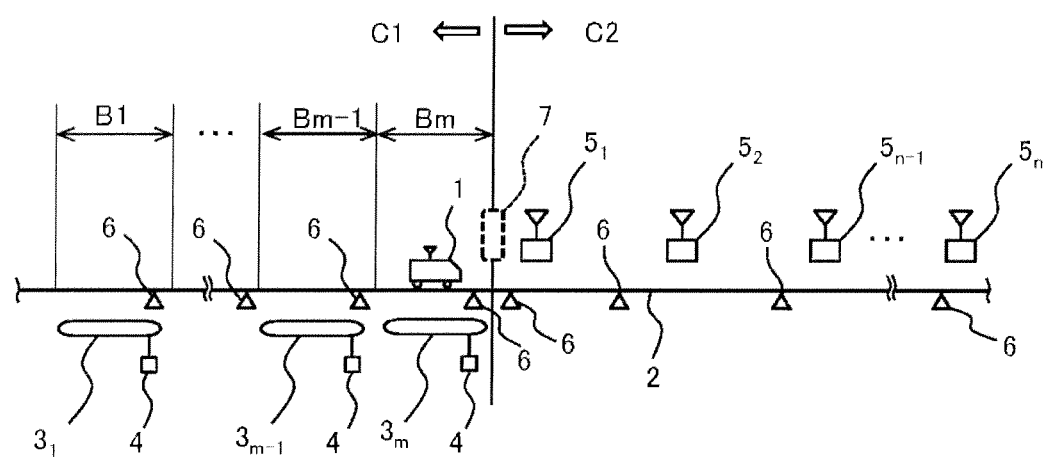
FIG. 1 is a diagram illustrating an example of ground-side equipment of train control systems to which an on-board device according to an embodiment of the present invention is applied.

FIG. 1 illustrates an example of ground-side equipment of train control systems to which an on-board device according to an embodiment of the present invention is applied. In FIG. 1, a route 2 along which a train 1 travels is divided into two control zones (first zone C1 and second zone C2), where the on-board device according to the embodiment is mounted on the train, and train control is performed by different block systems in the two control zones, respectively. Specifically, train control by a fixed block system is performed in the first zone C1, and train control by a moving block system is performed in the second zone C2.

In the first zone C1, the route 2 is divided into multiple block sections B1 to Bm, and loop coils $3_1$ to $3_m$ corresponding to the respective block sections B1 to Bm are installed along the route 2. An information transmission unit 4 is connected to each of the loop coils $3_1$ to $3_m$, respectively. This information transmission unit 4 is controlled by an unillustrated higher level device (Centralized Traffic Control (CTC) or the like) to send a corresponding loop coil a train control signal (hereinafter simply called "ATC signal") including stop section information indicative of a block section in which the train is to stop. Note that the ATC signal may further include speed limit information on the train 1 in addition to the stop section information.

Here, though not illustrated in FIG. 1, a known structure for detecting an on-rail train in each of the block sections B1 to Bm is provided in each of the loop coils $3_1$ to $3_m$. The structure for detecting an on-rail train is, for example, a TD signal receiver that receives a train detection signal (TD signal) sent from the train. Furthermore, though loop coils are used herein, track circuits may be used instead of the loop coils. When the track circuits are used, an on-rail train is detected based on the signal current flowing through the track circuits.

On the other hand, in the second zone C2, wayside radio sets $5_1$ to $5_n$ are installed at predetermined intervals along the route 2. Each of the wayside radio sets $5_1$ to $5_n$ has an antenna, and is controlled by an unillustrated higher level control device to send a train control signal (hereinafter simply called "CBTC signal") including stop limit information indicative of a limit to which the train 1 can travel. The stop limit information indicates a stop position at which train 1 is to stop, which includes a position that can ensure a safe distance (interval) from the preceding train, for example.

Here, the wayside radio set $5_1$ closest to the first zone C1 is so installed that at least part of the block section Bm closest to the second zone C2 will be included in a range within which the signal can be transmitted (signal transmission range). In the second zone C2, adjacent wayside radio sets perform radio communication with each other to enable the transmission of information while relaying the information. The interval between wayside radio sets just has to be set so that each other's signal transmission ranges will overlap, but the wayside radio sets are preferably installed at an interval capable of transmitting the signal up to the wayside radio set after the next.

Ground coils 6 are installed in the first zone C1 and the second zone C2 at predetermined intervals along the route 2. In the first zone C1, the ground coils 6 are installed at the border between adjacent block sections or near the border. In the second zone C2, the ground coils 6 are installed, for example, at constant intervals. Each of the ground coils 6 is made up of a transponder and the like, and electromagnetically coupled to an on-board coil on the side of the train 1 to be described later to transmit and receive signals. In the embodiment, each of the ground coils 6 transmits a signal (hereinafter simply called "position signal") including position information indicative of a position on the route 2.

Figure 2:
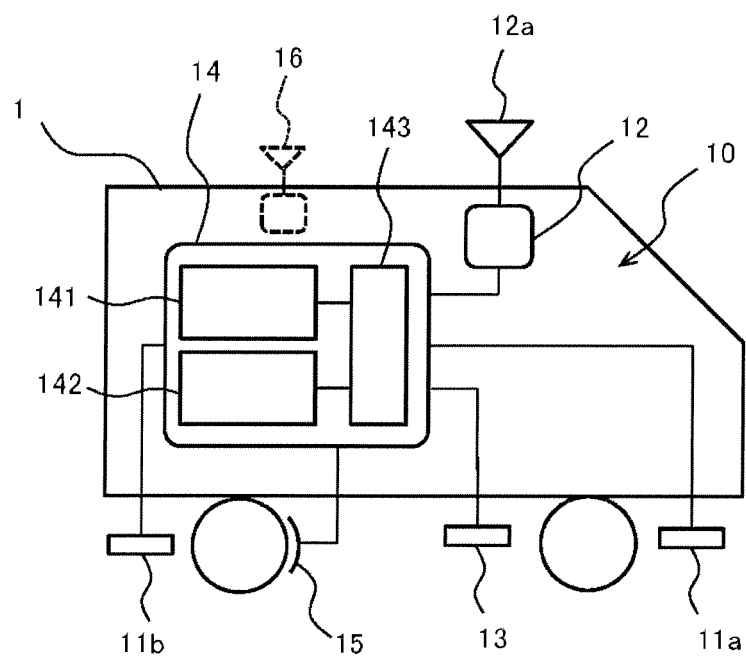
FIG. 2 is a block diagram illustrating the configuration of the on-board device according to the embodiment of the present invention.

FIG. 2 illustrates the basic configuration of an on-board device according to a first embodiment of the present invention.

As illustrated in FIG. 2, an on-board device 10 mounted on the train 1 includes ATC/TD antennas 11a and 11b, a vehicle radio set 12, an on-board coil 13, and a signal processing unit 14.

The ATC/TD antennas 11a and 11b are provided in front and rear bottom portions of the train 1, and electromagnetically coupled to the loop coils $3_1$ to $3_m$ installed on the ground side to receive the ATC signal from the loop coils and send the TD signal to the loop coils. The ATC signal is generally received at an ATC/TD antenna located on the front side in the traveling direction of the train 1. Note that receiver(s) may be used instead of the ATC/TD antennas 11a and 11b.

The vehicle radio set 12 has an antenna 12a provided on the top of the train 1 to transmit, to each of the wayside radio sets $5_1$ to $5_n$, a train position signal indicative of the position of the train 1 and receive the CBTC signal from each of the wayside radio sets $5_1$ to $5_n$. Although one vehicle radio set 12 is illustrated in FIG. 2, vehicle radio sets 12 may be provided in front and rear portions like the ATC/TD antennas.

The on-board coil 13 is provided in a bottom portion of the train 1, and electromagnetically coupled to each of the ground coils 6 to receive the position signal from the ground coil 6.

The signal processing unit 14 is connected to the ATC/TD antennas 11a and 11b, the vehicle radio set 12, and the on-board coil 13 so that the ATC signal, the CBTC signal, and the position signal received by these components will be input to the signal processing unit 14. Furthermore, speed information on the train 1 is input to the signal processing unit 14, for example, from a speed generator (speed detector) 15 attached to a wheel of the train 1. The signal processing unit 14 includes an ATC control unit 141, a CBTC control unit 142, and a selection unit 143.

The ATC control unit 141 detects the position and speed of the train 1 based on position information included in the position signal and the speed information. Then, the ATC control unit 141 creates a speed check pattern based on the detected position and speed of the train 1, stop section information (and speed limit information) included in the ATC signal, the brake performance of the train 1, and the like, and performs the brake control of the train 1 based on the speed check pattern in order to control the speed of the train 1.

The CBTC control unit 142 detects the position and speed of the train 1 based on position information included in the position signal and the speed information. The position of the train 1 can be calculated based on the signal propagation time between the vehicle radio set 12 and each of the wayside radio sets $5_1$ to $5_n$. Then, the CBTC control unit 142 creates a speed check pattern based on the detected position and speed of the train 1, stop limit information included in the CBTC signal, the brake performance of the train 1, and the like, and performs brake control based on the speed check pattern in order to control the speed of the train 1.

The selection unit 143 selects the ATC control unit 141 or the CBTC control unit 142 based on the input signal. In other words, the selection unit 143 activates (enables) only either one of ATC control unit 141 and CBTC control unit 142. As a result of this selection of a control unit by the selection unit 143, either one of the ATC control unit 142 and the CBTC control unit 142 performs the speed control of the train 1.

For example, the selection unit 143 selects a control unit as follows.

(1) When only either one of the ATC signal and the CBTC signal is received

In this case, the selection unit 143 selects a control unit corresponding to the received signal.

For example, when the train 1 is traveling through the first zone C1 (see FIG. 1), since no wayside radio set is installed in the first zone C1, the on-board device 10 can only receive the ATC signal. Therefore, only the ATC signal out of the ATC signal and the CBTC signal is input to the signal processing unit 14 (selection unit 143). In this case, the selection unit 143 selects the ATC control unit 141.

On the other hand, when the train 1 is traveling through the second zone C2, the on-board device 10 can only receive the CBTC signal. Therefore, only the CBTC signal out of the ATC signal and the CBTC signal is input to the signal processing unit 14 (selection unit 143). In this case, the selection unit 143 selects the CBTC control unit 142.

(2) When both the ATC signal and the CBTC signal are received from a state of receiving either one of them In this case, the selection unit 143 selects a control unit corresponding to a newly received signal to switch between the control units to perform the speed control of the train 1.

At least part of the block section Bm closest to the second zone C2 is located within a transmittable range of the wayside radio set $5_1$ closest to the first zone C1. Therefore, a zone (signal overlap zone) in which both the ATC signal and the CBTC signal can be received exists on the route 2. Thus, when the train 1 enters the second zone C2 from the first zone C1, the state gets into a state of receiving the ATC signal and the CBTC signal in the signal overlap zone from the state of receiving only the ATC signal. In this case, the selection unit 143 selects the CBTC control unit 142 corresponding to the CBTC signal newly received to switch from the previous control of the train 1 by the ATC control unit 141 to the control of the train 1 by the CBTC control unit 142. This switching is done in the signal overlap zone. Note that it is preferred to set the train 1 to travel at a low speed in the block section $B_m$ or the signal overlap zone without stopping the train in principle.

As for the speed check pattern, the speed check pattern created by the ATC control unit 141 is also switched to a speed check pattern to be created by the CBTC control unit 142 based on stop limit information included in the CBTC signal.

On the other hand, when the train 1 enters the first zone C1 from the second zone C2, the state gets into a state of receiving the ATC signal and the CBTC signal in the signal overlap zone from the state of receiving only the CBTC signal. In this case, the selection unit 143 selects the ATC control unit 141 corresponding to the ATC signal newly received to switch from the previous control of the train 1 by the CBTC control unit 142 to the control of the train 1 by the ATC control unit 141.

This leads to switching from the speed check pattern created by the CBTC control unit 142 to a speed check pattern to be created by the ATC control unit 141 based on stop section information included in the ATC signal.

The selection of a control unit (switching of train control) in the signal overlap zone is made so that not only the occurrence of a control blank period can be prevented but also switching can be done smoothly from control by the ATC control unit 141 to control by the CBTC control unit 142, or from control by the CBTC control unit 142 to control by the ATC control unit 141. Thus, the influence on the operation performance can be suppressed.

As mentioned above, the on-board device 10 according to the embodiment can not only receive the ATC signal from the loop coils (or track circuits) $3_1$ to $3_m$ and the information transmission unit 4 as the ground-side equipment for performing train control by the fixed block system but also receive the CBTC signal from the wayside radio sets $5_1$ to $5_n$, as the ground-side equipment for performing train control by the moving block system. Then, based on the ATC signal and/or the CBTC signal, the selection unit 143 determines which of the ATC control unit 141 and the CBTC control unit 142 is used to control the train 1.

When the ATC control unit 141 is selected, the control of the train 1 is performed by the ATC control unit 141 based on train control information (speed limit information and/or stop section information) included in the ATC signal, while when the CBTC control unit 142 is selected, the control of the train 1 is performed by the CBTC control unit 142 based on train control information (stop limit information) included in the CBTC signal.

Thus, the train with the on-board device 10 mounted thereon can travel safely through the first zone C1 and the second zone C2, each using different kinds of signals to perform train control of different systems. Furthermore, for example, even when a change is made from the train control system of the fixed block type to the train control system of the moving block type, since a conventional on-board device mounted on the train only have to be replaced by the on-board device 10 mentioned above, the alteration of the train only has to be made once. Thus, the number of alternations of the train at system change can be reduced compared with the conventional one.

Here, in the above embodiment, the ATC/TD antennas 11a and 11b (or receivers) receive the train control information from the loop coils $3_1$ to $3_m$ (or track circuits), but the train control information may be received from ground coils for train control information provided on the ground side separately from the ground coils 6. In this case, for example, the structure may be such that the a ground coil for train control information as ground-side equipment is provided in each of the block sections B1 to Bm, and in the on-board device 10, an on-board coil coupled to the ground coil for train control information to transmit and receive signals is provided separately from the on-board coil 13 instead of or in addition to the ATC/TD antennas 11a and 11b.

Furthermore, in the above embodiment, the selection unit 143 selects a control unit and switches between control units based on the presence or absence of the reception of the ATC signal and/or the CBTC. Alternatively, the selection unit 143 may switch between control units when receiving a switching signal for requesting switching between the control units. The following will describe the case as modifications of the above embodiment.

(First Modification)

The selection unit 143 switches control units based on a switching signal included in the ATC signal and/or the CBTC signal.

The ATC signal and the CBTC signal can further include information. Therefore, for example, the information transmission unit 4 connected to the loop coil $3_m$ corresponding to the block section Bm closest to the second zone C2 is adapted to sending the ATC signal including the switching signal in addition to the stop section information as the train control information to the train 1 headed from the first zone C1 to the second zone C2. The switching signal in this case is a signal for requesting switching from the ATC control unit 141 to the CBTC control unit 142.

Thus, when the train 1 enters the second zone C2 from the first zone C1, the selection unit 143 selects the CBTC control unit 142 to switch from the control of the train 1 by the ATC control unit 141 to the control of the train 1 by the CBTC control unit 142.

Furthermore, the wayside radio set $5_1$ closest to the first zone C1 is adapted to sending the CBTC signal including the switching signal in addition to the stop limit information as the train control information to the train 1 headed from the second zone C2 to the first zone C1. The switching signal in this case is a signal for requesting switching from the CBTC control unit 142 to the ATC control unit 141.

Thus, when the train 1 enters the second zone C2 from the first zone C1, the selection unit 143 selects the ATC control unit 141 to switch from the control of the train 1 by the CBTC control unit 142 to the control of the train 1 by the ATC control unit 141.

Note that since the traveling direction of the train 1 on the route 2 is generally fixed, it may be configured such that either of the information transmission unit 4 connected to the loop coils $3_m$ corresponding to the block section Bm closest to the second zone C2 and the wayside radio set $5_1$ closest to the first zone C1 sends a signal including the switching signal.

(Second Modification)

The selection unit 143 switches between control units based on a switching signal sent separately from the ATC signal and the CBTC As illustrated in FIG. 1, in the embodiment, the ground coils 6 are installed across the border between the first zone C1 and the second zone C2 . Therefore, it is configured such that a ground coil 6 located on the side of the first zone C1 out of the ground coils 6 across the border between the first zone C1 and the second zone C2 sends the position signal including a switching signal for requesting switching from the ATC control unit 141 to the CBTC control unit 142 in addition to the position information to the train 1 headed from the first zone C1 to the second zone C2. It is also configured such that a ground coil 6 located on the side of the second zone C2 out of the ground coils 6 across the border between the first zone C1 and the second zone C2 sends the position signal including a switching signal for requesting switching from the CBTC control unit 142 to the ATC control unit 141 in addition to the position information to the train 1 headed from the second zone C2 to the first zone C1.

The sent position signal is received by the on-board coil 13 and output to the signal processing unit 14. Thus, when the train 1 enters the second zone C2 from the first zone C1, the selection unit 143 selects the CBTC control unit 142 based on the switching signal included in the position signal to switch from the control of the train 1 by the ATC control unit 141 to the control of the train 1 by the CBTC control unit 142. On the other hand, when the train 1 enters the first zone C1 from the second zone C2, the selection unit 143 selects the ATC control unit 142 based on the switching signal included in the position signal to switch from the control of the train 1 by the CBTC control unit 142 to the control of the train 1 by the ATC control unit 141.

Of course, depending on the traveling direction of the train 1, only one of the ground coils 6 installed across the border between the first zone C1 and the second zone C2 may send the position signal including the switching signal.

Furthermore, as indicated by the broken line in FIG. 1, a transmitter 7 that sends the switching signal may be provided near the border between the first zone C1 and the second zone C2. In this case, as indicated by the broken line in FIG. 2, a receiver 16 that receives the switching signal sent from the transmitter 7 is also provided in the on-board device 10. For example, the transmitter 7 is adapted to being able to change the switching signal depending on the traveling direction of the train 1. When the train 1 heads from the first zone C1 to the second zone C2, a switching signal for requesting switching from the ATC control unit 141 to the CBTC control unit 142 is sent, while when the train 1 heads from the second zone C2 to the first zone C1 , a switching signal for requesting switching from the CBTC control unit 142 to the ATC control unit 141 is sent. The receiver 16 of the on-board device 10 receives the switching signal output from the transmitter 7 and outputs it to the signal processing unit 14.

Thus, when the train 1 enters the second zone C2 from the first zone C1, the selection unit 143 selects the CBTC control unit 142 to switch from the control of the train 1 by the ATC control unit 141 to the control of the train 1 by the CBTC control unit 142, while when the train 1 enters the first zone C1 from the second zone C2, the selection unit 143 selects the ATC control unit 141 to switch from the control of the train 1 by the CBTC control unit 142 to the control of the train 1 by the ATC control unit 141.

The above has described a case where the route 2 along which the train 1 travels is divided into the first zone C1 in which train control (ATC/TD system) by the fixed block system is performed and the second zone C2 in which train control (CBTC system) by the moving block system using radio is performed. However, the present invention is not limited to this.

For example, there may be a case where both the first zone C1 and the second zone C2 perform train control by moving block systems using radio but both using different kinds of radios (e.g., using signals in different frequency bands from each other). Even in such a case, the signal sent from the ground-side equipment installed in the first zone C1 is different in kind from the signal sent from the ground-side equipment installed in the second zone C2. The following will describe the case as a second embodiment of the present invention.

Figure 3:
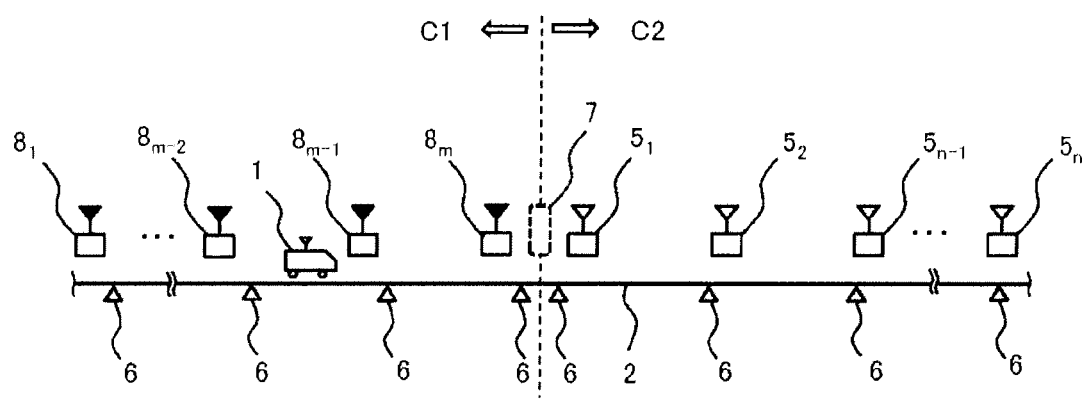
FIG. 3 is a diagram illustrating another example of ground-side equipment of train control systems to which an on-board device according to another embodiment of the present invention is applied.

FIG. 3 illustrates ground-side equipment of train control systems to which an on-board device according to the second embodiment of the present invention is applied. The same numerals will be used for the same components as those in FIG. 1 to omit redundant description. In FIG. 3, train control by moving block systems using radio is performed in both the first zone C1 and the second zone C1 . Therefore, like in the second zone C2, wayside radio sets $8_1$ to $8_m$ are also installed in the first zone C1 at predetermined intervals along the route 2.

Each of the wayside radio sets $8_1$ to $8_m$ installed in the first zone C1 has an antenna, and is controlled by an unillustrated first higher level control device to send a train control signal (hereinafter called "first CBTC signal") including stop limit information indicative of a limit to which the train 1 can travel. Each of the wayside radio sets $5_1$ to $5_n$ installed in the second zone C2 has an antenna, and is controlled by an unillustrated second higher level control device to send a train control signal (hereinafter called "second CBTC signal") including stop limit information indicative of a limit to which the train 1 can travel. Note that the first CBTC signal and the second CBTC signal are radio signals of different kinds. For example, both signals each use different frequency bands.

Figure 4:
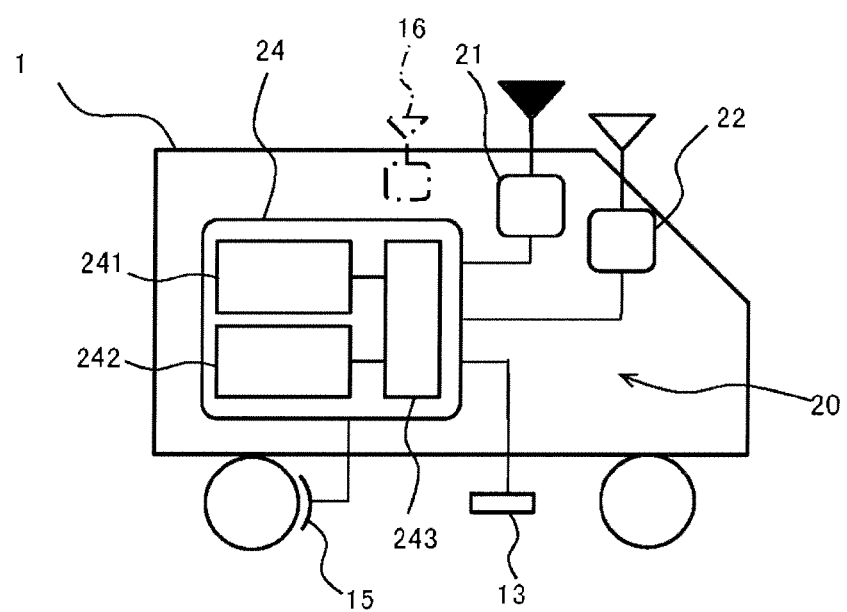
FIG. 4 is a block diagram illustrating the configuration of the on-board device according to the other embodiment of the present invention.

FIG. 4 illustrates the basic configuration of an on-board device according to the second embodiment of the present invention. The same numerals will be used for the same components as those in FIG. 2 to omit redundant description.

As illustrated in FIG. 4, an on-board device 20 according to the second embodiment includes a first vehicle radio set 21, a second vehicle radio set 22, an on-board coil 13, and a signal processing unit 24.

The first vehicle radio set 21 receives the first CBTC signal from each of the wayside radio sets $8_1$ to $8_m$ installed in the first zone C1. The second vehicle radio set 22 receives the second CBTC signal from each of the wayside radio sets $5_1$ to $5_n$ installed in the second zone C2.

The signal processing unit 24 is connected to the first vehicle radio set 21, the second vehicle radio set 22, and the on-board coil 13, and the first and second CBTC signals and the position signal received by these components are input to the signal processing unit 24. Furthermore, speed information on the train 1 is input to the signal processing unit 24, for example, from the speed generator (speed detector) 15 attached to a wheel of the train 1. The signal processing unit 24 includes a first CBTC control unit 241, a second CBTC control unit 242, and a selection unit 243.

The first CBTC control unit 241 detects the position and speed of the train 1 based on position information included in the position signal and the speed information. The position of the train 1 can also be calculated based on the signal propagation time between the first vehicle radio set 21 and each of the wayside radio sets $8_1$ to $8_m$. Then, the first CBTC control unit 241 creates a speed check pattern based on the detected position and speed of the train 1, stop section information included in the first CBTC signal, the brake performance of the train 1, and the like, and performs brake control based on the speed check pattern in order to control the speed of the train 1.

Since the processing by the second CBTC control unit 242 is the same as that by the CBTC control unit 142 in the first embodiment, redundant description will be omitted.

The selection unit 243 selects the first CBTC control unit 241 or the second CBTC control unit 242 based on the input signal. Note that the selection of a control unit and switching between control units by the selection unit 243 are substantially the same as those by the selection unit 143 in the first embodiment mentioned above (the same applies to each modification).

The on-board device 20 according to the second embodiment can also attain the same effect as the on-board device 10 according to the first embodiment mentioned above. Especially, the on-board device 20 according to the second embodiment allows the train 1 to travel safely through the first zone C1 and the second zone C2 in which train control is performed using different kinds of radios (different kinds of signals).

Here, the on-board device 20 according to the second embodiment may be configured such that the first vehicle radio set 21 or the second vehicle radio set 22 receives a switching signal from the transmitter 7 installed near the boarder between the first zone C1 and the second zone C2 without providing the receiver 16.

It should be noted that the entire contents of Japanese Patent Application No. 2011-216843, filed on Sep. 30, 2011, on which convention priority is claimed, is incorporated herein by reference.

It should also be understood that many modifications and variations of the described embodiments of the invention will be apparent to a person having an ordinary skill in the art without departing from the spirit and scope of the present invention as claimed in the appended claims.

What is claimed is:

1. An on-board device mounted on a train to control the train based on train control information received from ground-side equipment, comprising:
    a first receiving unit configured to receive a first signal including train control information from first ground-side equipment installed along a route of the train;
    a second receiving unit configured to receive a second signal differing in kind from the first signal and including train control information from second ground-side equipment installed along the route;
    a first control unit that controls the train based on the train control information included in the first signal;
    a second control unit that controls the train based on the train control information included in the second signal; and
    a selection unit that selects the first control unit or the second control unit,
    wherein at least one of the first ground-side equipment and the second ground-side equipment are wayside radio sets installed along the route.

2. The on-board device according to claim 1, wherein the selection unit selects the first control unit or the second control unit based on at least either one of the first signal and the second signal.

3. The on-board device according to claim 2, wherein:
    when only the first signal is received, the selection unit selects the first control unit, and
    when only the second signal is received, the selection unit selects the second control unit.

4. The on-board device according to claim 2, wherein when a state of receiving only the first signal transitions to a state of receiving the first signal and the second signal, the selection unit selects the second control unit to switch from control of the train by the first control unit to control of the train by the second control unit.

5. The on-board device according to claim 2, wherein the selection unit switches from control of the train by the first control unit to control of the train by the second control unit based on a switching signal included in at least one of the first signal and the second signal.

6. The on-board device according to claim 1, further comprising:
    a third receiving unit configured to receive a switching signal sent from third ground-side equipment installed near a border between a first zone in which the first ground-side equipment are installed and a second zone in which the second ground-side equipment are installed,
    wherein the selection unit switches from control of the train by the first control unit to control of the train by the second control unit based on the switching signal received by the third receiving unit.

7. The on-board device according to claim 6, wherein the first receiving unit or the second receiving unit has a function as the third receiving unit.

8. The on-board device according to claim 1, wherein
    one of the first receiving unit and the second receiving unit receives the first signal or the second signal by electromagnetically coupling to the first ground-side equipment or the second ground-side equipment, and
    the other of the first receiving unit and the second receiving unit receives the first signal or the second signal transmitted by radio from the first ground-side equipment or the second ground-side equipment.

9. The on-board device according to claim 1, wherein the first signal and the second signal are radio signals differing in frequency band.

10. The on-board device according to claim 1, wherein
    the first ground-side equipment are installed to perform train control by one of a fixed block system and a moving block system, and
    the second ground-side equipment are installed to perform train control by the other of the fixed block system and the moving block system.

11. An on-board device mounted on a train to control the train based on train control information received from ground-side equipment, comprising:
    a first receiving unit configured to receive a first signal including train control information from first ground-side equipment installed along a route of the train;
    a second receiving unit configured to receive a second signal differing in kind from the first signal and including train control information from second ground-side equipment installed along the route;
    a first control unit configured to control the train based on the train control information included in the first signal;
    a second control unit configured to control the train based on the train control information included in the second signal;
    a selection unit configured to select the first control unit or the second control unit, a third receiving unit configured to receive a switching signal sent from third ground-side equipment installed near a border between a first zone in which the first ground-side equipment are installed and a second zone in which the second ground-side equipment are installed, wherein the selection unit is configured to select from control of the train by the first control unit to control of the train by the second control unit based on the switching signal received by the third receiving unit.

12. The on-board device according to claim 11, wherein the first receiving unit or the second receiving unit has a function as the third receiving unit.

* * * * *